(12) United States Patent
Takeda (10) Patent No.: US 10,300,520 B2
(45) Date of Patent: May 28, 2019

(54) WORKPIECE CONVEYING APPARATUS FOR A PRESSING MACHINE WITH TWO ROBOTS

(71) Applicant: AIDA ENGINEERING, LTD., Sagamihara-shi, Kanagawa (JP)

(72) Inventor: Keisuke Takeda, Kanagawa (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 0 days.

(21) Appl. No.: 15/439,394

(22) Filed: Feb. 22, 2017

(65) Prior Publication Data

US 2017/0239705 A1 Aug. 24, 2017

(30) Foreign Application Priority Data

Feb. 23, 2016 (JP) .................................. 2016-031923

(51) Int. Cl.
*B21D 43/10* (2006.01)
*B25J 9/00* (2006.01)
(Continued)

(52) U.S. Cl.
CPC ......... *B21D 43/105* (2013.01); *B21D 43/052* (2013.01); *B21D 43/18* (2013.01);
(Continued)

(58) Field of Classification Search
CPC ............................... B25J 9/009; B21D 43/105
See application file for complete search history.

(56) References Cited

U.S. PATENT DOCUMENTS 5,584,205 A * 12/1996 Harsch ................. B21D 43/052
72/405.02
6,968,725 B2 * 11/2005 Harsch .................. B21D 43/05
72/405.01

(Continued)

FOREIGN PATENT DOCUMENTS

| JP | 2009-208080 A | | 9/2009 |
|----|---------------|---|--------|
| JP | 2009208080 A | * | 9/2009 |
| JP | 5274053 B2 | | 8/2013 |

OTHER PUBLICATIONS

Extended European Search Report issued in corresponding EP Patent Application No. 171574783, dated Jul. 25, 2017.

(Continued)

*Primary Examiner* — Gerald McClain
(74) *Attorney, Agent, or Firm* — McDermott Will & Emery LLP (57) ABSTRACT

Provided is a workpiece conveying apparatus including: two SCARA robots each including: a raising and lowering frame supported on a stationary frame so as to be movable in an up-and-down direction, the stationary frame being mounted to extend along a width direction orthogonal to a workpiece conveying direction of a passage space for conveying a workpiece; a first arm supported on the raising and lowering frame through intermediation of a first joint; a second arm held through intermediation of a second joint; a first arm driving mechanism configured to drive the first arm to rotate; and a second arm driving mechanism configured to drive the second arm to rotate; raising and lowering mechanisms arranged to correspond to the two SCARA robots, respectively, and configured to enable the corresponding raising and lowering frames to mutually independently move in the up-and-down direction; a cross arm; and a cross bar unit.

5 Claims, 13 Drawing Sheets

(51) Int. Cl.
  *B21D 43/05*  (2006.01)
  *B25J 9/10*   (2006.01)
  *B21D 43/18*  (2006.01)
  *B65G 47/90*  (2006.01)
  *B65G 47/91*  (2006.01)

(52) U.S. Cl.
  CPC .............. *B25J 9/009* (2013.01); *B25J 9/107* (2013.01); *B65G 47/902* (2013.01); *B65G 47/91* (2013.01)

(56) References Cited

U.S. PATENT DOCUMENTS

| | | | |
|---|---|---|---|
| 9,339,861 B2* | 5/2016 | Takeda | B21D 43/055 |
| 10,052,678 B2* | 8/2018 | Takeda | B21J 13/10 |
| 2002/0029701 A1* | 3/2002 | Harsch | B21D 43/05 |
| | | | 100/139 |
| 2002/0088266 A1 | 7/2002 | Hofele et al. | |
| 2013/0008761 A1* | 1/2013 | Takeda | B21D 43/055 |
| | | | 198/339.1 |
| 2015/0246446 A1 | 9/2015 | Casanelles Moix et al. | |
| 2016/0067842 A1* | 3/2016 | Yoshimoto | B21D 43/05 |
| | | | 414/591 |
| 2017/0259434 A1* | 9/2017 | Takeda | B25J 9/0018 |
| 2018/0361521 A1* | 12/2018 | Takeda | B25J 9/042 |

OTHER PUBLICATIONS

Chinese Office Action issued in corresponding Chinese Patent Application No. 201710059920.4, dated Jul. 27, 2018, with English Translation.

\* cited by examiner

FIG.4B  FIG.4E (COMPLETION OF WORKPIECE CONVEYANCE)

DIRECTION OF SETTING
TO-BE-PROCESSED

RAISING AND LOWERING MECHANISM
RAISING AND LOWERING MECHANISM
SCARA ROBOT
ARM UNIT
SCARA ROBOT
SUPPORT FRAME
ARM UNIT
SLIDE ARM

Z-AXIS DIRECTION (LIFTING DIRECTION)
X-AXIS DIRECTION (WORKPIECE CONVEYING DIRECTION)
Y-AXIS DIRECTION (SHIFTING DIRECTION)

*FIG. 13B*

PORTION ASSUMED TO INTERFERE WITH OTHER COMPONENTS
ARM UNIT
ARM UNIT
SUPPORT FRAME
ARM UNITS ARE LONG, AND ARE LIABLE TO INTERFERE WITH OTHER COMPONENTS WHEN ARM UNITS ARE INCLINED.

Z-AXIS DIRECTION (LIFTING DIRECTION)
Y-AXIS DIRECTION (SHIFTING DIRECTION)

WORKPIECE CONVEYING APPARATUS FOR A PRESSING MACHINE WITH TWO ROBOTS

BACKGROUND OF THE INVENTION

1. Field of the Invention

The present invention relates to a workpiece conveying apparatus (workpiece conveying robot) for a pressing machine (press machine).

2. Description of the Related Art

Hitherto, there have been proposed various workpiece conveying apparatus configured to carry workpieces into and out of a press machine, or carry workpieces between the press machines.

Figure 13A:
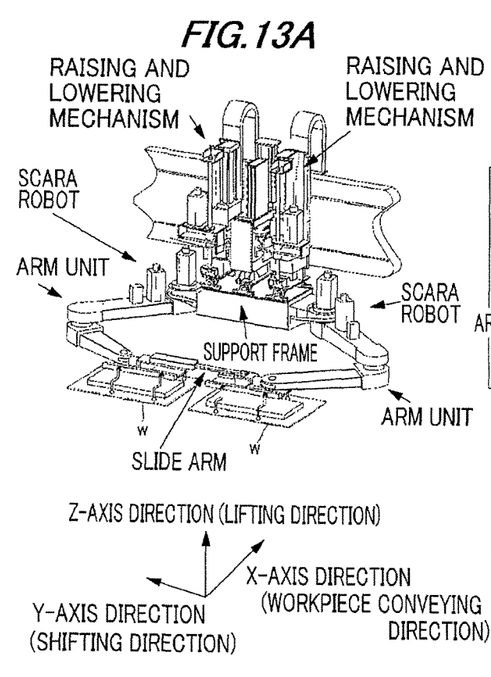
FIG. 13A is a perspective view for illustrating a related-art workpiece conveying apparatus.

For example, in Patent Literature 1, there is described a workpiece conveying apparatus as illustrated in FIG. 13A. The workpiece conveying apparatus can mutually independently control arm units of two selective compliance assembly robot arm robots (SCARA robots), and distal ends of the arm units of the SCARA robots are coupled to each other by slide arms.

Herein, Patent Literature 1 corresponds to Japanese Patent No. 5274053.

Here, the related-art workpiece conveying apparatus cannot perform a feeding axis rotation (rolling), that is, an operation of rotating a workpiece about an axis extending along a workpiece conveying direction. Accordingly, in actuality, there is difficulty in adopting the related-art workpiece conveying apparatus, for example, when it is desired that a workpiece W in an oblique state be fed to a die for a subsequent step, which is often desired by European manufacturers and the like.

In this context, in the workpiece conveying apparatus described in Patent Literature 1, lifting shafts (shafts extending in a height direction) arranged on right and left raising and lowering mechanisms are shifted to different phases to incline a support frame (entire apparatus). In this way, the feeding axis rotation (rolling) is enabled.

Figure 13B:
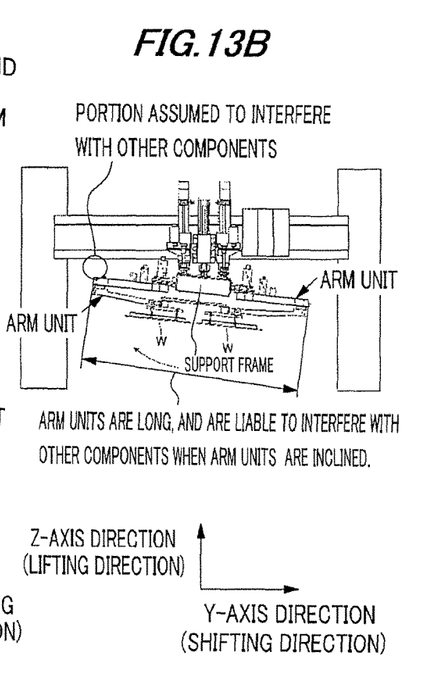
FIG. 13B is a front view for illustrating a problem that arises in the related-art workpiece conveying apparatus, specifically, a problem of interference when arm units are inclined.

However, this method involves a problem in that higher rotational energy is required, and a motor size needs to be increased, with the result that the apparatus is increased in size. Further, as illustrated in FIG. 13B, the entire arm units are inclined to enter a press. Accordingly, in actuality, there is a high risk of interference between inclined arms and an upper die, with the result that it is necessary to increase a stroke of the press. Further, in the workpiece conveying apparatus described in Patent Literature 1, it is necessary to incline the arm units elongated laterally within a plane of the drawing sheet of FIG. 13B. In other words, when an inclination angle is equal, amplitude of vibration increases as the arm units become longer. Accordingly, the arm units are liable to interfere with other components. Thus, in actuality, a large inclination angle cannot be taken.

SUMMARY OF THE INVENTION

According to one embodiment of the present invention, there is provided a workpiece conveying apparatus for a pressing machine, including:

two robots arranged symmetrically with respect to an XZ plane passing a workpiece conveying center, each of the two robots including:

a raising and lowering frame supported on a stationary frame so as to be movable in a Z-axis direction being an up-and-down direction, the stationary frame being mounted to extend along a Y-axis direction that is a width direction orthogonal to an X-axis direction being a workpiece conveying direction of a passage space for conveying a workpiece;

a first arm supported at a proximal end side thereof on the raising and lowering frame through intermediation of a first joint so as to be freely rotatable within a horizontal plane;

a second arm supported at a proximal end side thereof on a distal end side of the first arm through intermediation of a second joint so as to be freely rotatable within the horizontal plane;

a first arm driving mechanism configured to drive the first arm to rotate about the first joint with respect to the raising and lowering frame; and a second arm driving mechanism configured to drive the second arm to rotate about the second joint with respect to the first arm;

two raising and lowering mechanisms arranged to correspond to the two robots, respectively, and configured to enable the corresponding raising and lowering frames to mutually independently move in the Z-axis direction;

a cross arm configured to couple distal ends of second arms arranged on both sides across the XZ plane so as to be freely rotatable within the horizontal plane through intermediation of a third joint and freely rotatable within a vertical plane through intermediation of a fourth joint; and a workpiece holding unit connected to the cross arm and configured to releasably hold the workpiece.

According to one embodiment of the present invention, the workpiece holding unit is removably connected to the cross arm.

According to one embodiment of the present invention, the workpiece conveying apparatus further includes a tilting mechanism configured to rotate one of the cross arm and the workpiece holding unit about a rotation axis parallel to a longitudinal direction of the one of the cross arm and the workpiece holding unit.

DESCRIPTION OF THE EMBODIMENTS

Now, with reference to the accompanying drawings, description is made of a workpiece conveying apparatus for a pressing machine according to an exemplary embodiment of the present invention. The present invention is not limited to the embodiment described below.

The present invention has been made in view of the above-mentioned circumstances, and has an object to provide a workpiece conveying apparatus for a pressing machine capable of, with a relatively simple, low-cost, lightweight, and compact configuration, changing a conveyance posture (posture during conveyance) of the workpiece with a high degree of freedom.

Herein, a center in a width direction orthogonal to a workpiece conveying direction of a passage space for conveying a workpiece is referred to as a workpiece conveying center.

The workpiece conveying apparatus for a pressing machine according to this embodiment can be used not only for carrying a workpiece into and out of a press machine, but also for conveying the workpiece between a plurality of press machines arranged on a press line from an upstream step to a downstream step. Therefore, the workpiece includes a plate-like metal member as a raw workpiece, and a finished product formed after press forming. When the workpiece is subjected to press working by the plurality of press machines, the workpiece also includes an unfinished product, and a plurality of divided pieces of a plate-like metal member formed after press working.

As illustrated in FIG. 1 to FIG. 5, a workpiece conveying apparatus 1 for a pressing machine according to this embodiment includes:

two robots (SCARA robots) 101A and 10B respectively including arm units 20A and 20B each including two arms (a first arm 21 and a second arm 31), the two robots being supported on a stationary frame F so as to be movable in an up-and-down direction (Z-axis direction), the stationary frame F being stationarily mounted to a press line (press machine) along a width direction (lateral direction or a Y-axis direction) orthogonal to a workpiece conveying direction;

raising and lowering mechanisms 10A and 10B configured to raise and lower the two robots 101A and 101B with respect to the stationary frame F, respectively and independently of each other, that is, mutually independently;

one (common) cross arm 102 connected to a distal end of the second arm 31 of each of the two arm units 20A and 20B; and a cross bar unit 103 connected to the cross arm 102.

With respect to a vertical plane (XZ plane) passing a workpiece conveying center, the robot (SCARA robot) 101A is arranged to be substantially symmetrical, that is, planar symmetrical with the robot (SCARA robot) 101B.

The raising and lowering mechanism 10A (10B), which is configured to raise and lower the robot 101A (101B), that is, to move the robot 101A (101B) in the Z-axis direction, includes a servomotor 2, a ball screw 3, a ball screw nut (screw) 4, and a linear guide rail 5. A raising and lowering frame 11 of the robot 101A (101B) is connected to the ball screw nut 4 that is raised and lowered (or moved up and down) along the ball screw 3 arranged substantially upright, that is, arranged to extend in the Z-axis direction.

When the ball screw 3 is rotated by a driving force of the servomotor 2, the ball screw nut 4 threadedly engaged with the ball screw 3 is raised and lowered. In this manner, the robot 101A (101B) connected to the ball screw nut 4 through intermediation of the raising and lowering frame 11 can be raised and lowered in the up-and-down direction, that is, the Z-axis direction.

One servomotor 2 is arranged for each of the robots 101A and 101B in order to raise and lower each of the robots 101A and 101B. Typically, servomotors 2 are driven in synchronization so as to move the robot 101A (101B) from the same position, at the same timing, in the same direction, at the same speed, and by the same distance, thereby raising and lowering the robots 101A and 101B in the Z-axis direction in synchronization.

Further, in this embodiment, the servomotors 2 can mutually independently be driven. Thus, the robots 101A and 101B can mutually independently be raised and lowered in the Z-axis direction.

Here, the two robots 101A and 101B include the corresponding arm units 20A and 20B, respectively. The arm unit 20A (20B) includes:

the first arm 21 supported on the raising and lowering frame 11 through intermediation of a first joint 10X corresponding to a vertical axis or a Z-axis so as to be freely rotatable within a horizontal plane, that is, within the XY plane;

the second arm 31 supported on a distal end of the first arm 21 through intermediation of a second joint 20X corresponding to the vertical axis or the Z-axis so as to be freely rotatable (hereinafter, the term "rotatable" also encompasses turnable and pivotable) within the horizontal plane, that is, within the XY plane;

the cross arm 102 coupled to the distal ends of the second arms 31 of the arm units 20A and 20B so as to be freely rotatable within the horizontal plane, that is, within the XY plane through intermediation of a third joint 30X;

a first arm driving mechanism DM1, which includes a servomotor 13 and a speed reducer 14, configured to drive the first arm 21 to rotate about the first joint 10X with respect to the raising and lowering frame 11; and a second arm driving mechanism DM2, which includes a servomotor 22 and a speed reducer 23, configured to drive the second arm 31 to rotate about the second joint 20X with respect to the first arm 21.

The cross arm 102 is connected to (or pivotally supported on) the distal end of the second arm 31 of each of the robots 101A and 101B through intermediation of a bearing 32 so as to be rotatable about the third joint 30X.

Through drive and control of the arm units 20A and 203 of the two robots 101A and 101B in synchronization with each other, the two robots 101A and 101B are caused to move symmetrically, that is, planer symmetrically with respect to the vertical plane passing the workpiece conveying center, that is, with respect to the XZ plane. For example, the servomotors 13 and 22 respectively rotate the first arm 21 and the second arm 31 about the respective joints. In this manner, the cross arm 102 and a workpiece W are moved (or conveyed) in the workpiece conveying direction which is the X-axis direction (see FIG. 4A to FIG. 4E).

Further, the arm units 20A and 203 of the two robots 101A and 101B are driven not in synchronization with each other, an arm angle of each of the first arm 21 and the second arm 31, specifically, a rotating amount about the joint is controlled. Thus, the robots 101A and 101B can perform an operation of moving the workpiece in a shifting direction, which is the Y-axis direction (see FIG. 7), and can perform an operation of rotating the workpiece about the Z-axis (see FIG. 8).

As described above, the servomotors 2, which are arranged to correspond to the robots 101A and 101B, respectively, can mutually independently be driven and controlled, and can mutually independently raise and lower the robots 101A and 101B. Typically, in order to raise and lower the robots 101A and 101B, that is, in order to move the robots 101A and 101B in the Z-axis direction, the two servomotors 2 perform raising and lowering operations in synchronization with each other. However, when the two servomotors 2 are operated at different speeds, the two servomotors 2 can not only merely raise and lower the robots 101A and 101B, but also shift positions of the right and left robots 101A and 101B in the Z-axis direction, which is a height direction. Further, the two servomotors 2 can incline the cross arm 102, the cross bar unit 103, and the workpiece W held (or grasped or supported) by the cross bar unit 103 about an X-axis within a YZ plane (see FIG. 9).

Here, in this embodiment, only the cross arm 102, the cross bar unit 103, and the workpiece W held by the cross bar unit 103 can be inclined (or rolled) about the X-axis within the YZ plane. Accordingly, as compared to a case where the entire arm units are inclined as in the workpiece conveying apparatus described in Patent Literature 1, rotational energy can be reduced. Thus, a size of a driving motor can be reduced, thereby being capable of achieving reduction in weight and size of the apparatus.

In addition, in this embodiment, only the cross arm 102 having a relatively small length, the cross bar unit 103, and the workpiece W held by the cross bar unit 103 are inclined. Accordingly, as compared to a case where the entire arm units each having a large length are inclined as in the workpiece conveying apparatus described in Patent Literature 1, interference with another component is less liable to occur. Therefore, a large inclination angle (rolling angle) can be taken.

The cross arm 102 includes a center arm 51, and two holders 45 respectively arranged at both ends of the center arm 51 and respectively connected to the distal ends of the second arms 31 of the robots 101A and 101B. Each of the holders 45 and the center arm 51 are connected to each other through intermediation of a bearing 54, which is freely rotatable about a fourth joint 40X (X-axis), so as to be rotatable in the up-and-down direction, that is, within the YZ plane.

With this configuration, when the right and left robots 101A and 10B are raised and lowered to different positions, specifically, positions in the Z-axis direction or the height direction, the center arm 51 is inclined. Thus, the cross bar unit 103 connected to the center arm 51, and the workpiece W can be inclined (see FIG. 9).

Further, the bearing 54, which couples the center arm 51 and each of the holders 45 together at one end of the cross arm 102, is linearly movable by a minute distance along a longitudinal direction of the cross arm 102 with respect to the center arm 51 (or each of the holders 45). With this configuration, stress applied on a machine due to errors of control of the right and left arm units 20A and 20B can be mitigated.

In addition, in this embodiment, a tilting mechanism TM is arranged between the distal end of the second arm 31 and the holder 45 mounted at each end of the cross arm 102.

The tilting mechanism TM includes a bracket 41 coupled to the second arm 31 through intermediation of the third joint 30X, a servomotor 42, and a speed reducer 43. The tilting mechanism TM can rotate (or tilt) the center arm 51 about a Y-axis which is a shifting axis, that is, about a rotation axis parallel to a longitudinal direction of the center arm 51 with respect to the bracket 41 and the second arm 31 (see FIG. 5).

However, the tilting mechanism TM may be arranged on the cross bar unit 103 side, and may rotate (or tilt) a cross bar 71 about the rotation axis parallel to a longitudinal direction of the cross bar 71.

Couplers 61 and 62 removably connect the cross bar unit 103 to a lower center portion of the center arm 51 of the cross arm 102. As each of the couplers 61 and 62, there can be adopted, for example, a quick changer (tool changer), which is manufactured by BL AUTOTEC, Ltd. and readily and commercially available.

The cross bar unit 103 includes the bar-like crossbar 71 elongated in a direction, specifically, the Y-axis direction or the shifting direction orthogonal to the workpiece conveying direction, and grasping tools 81 mounted to the cross bar 71. Each of the grasping tools 81 includes spiders (pipe-like elements) 81A, suction cups 81B, and the like. Each of the grasping tools 81 has such a configuration that the suction cups 81B can draw and hold the workpiece, and can release the drawn and held workpiece.

Here, the above-mentioned cross bar unit 103 corresponds to an example of a workpiece holding unit according to the present invention.

However, it is only necessary that the workpiece holding unit according to the present invention be a unit (device) that is connected to the cross arm and is capable of releasably holding the workpiece. Therefore, the workpiece holding unit is not limited to the above-mentioned cross bar unit 103 which includes the cross bar 71 connected to the cross arm 102, the spiders 81A, and the suction cups 81B. For example, the concept of the workpiece holding unit according to the present invention also encompasses such a configuration that the cross bar 71 is not arranged, and that the spiders 81A, the suction cups 81B, and the like are directly connected to the cross arm 102.

Now, workpiece conveying operations of the workpiece conveying apparatus 1 according to this embodiment are described.

<Workpiece Conveying Operations of Moving Workpiece in X-Axis Direction (Workpiece Conveying Direction) and Moving Workpiece in Z-Axis Direction (Height Direction or Up-and-Down Direction)>

<Step 1>

Figure 1:
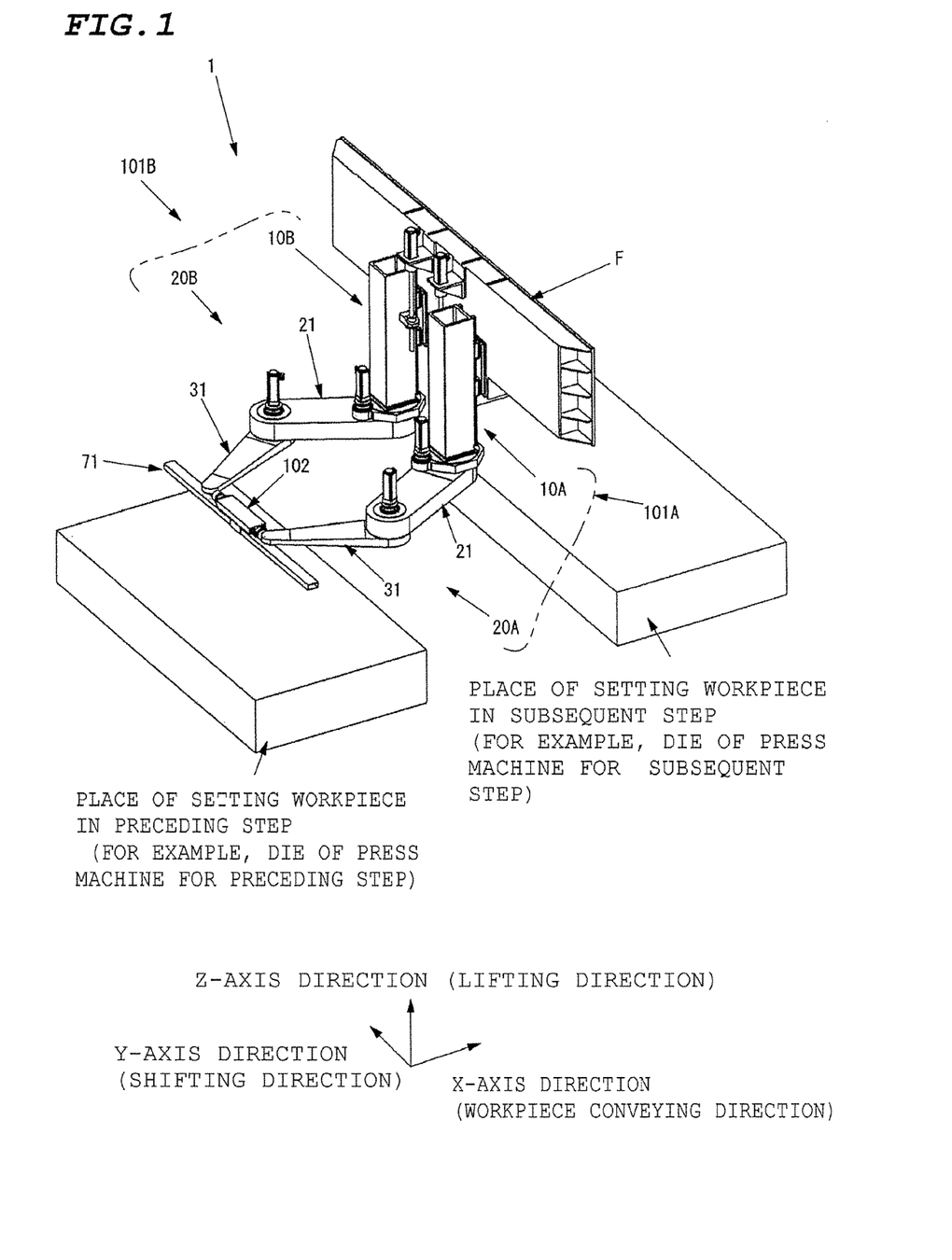
FIG. 1 is a perspective view for illustrating an overall configuration of a workpiece conveying apparatus according to one embodiment of the present invention.
Figure 2A:
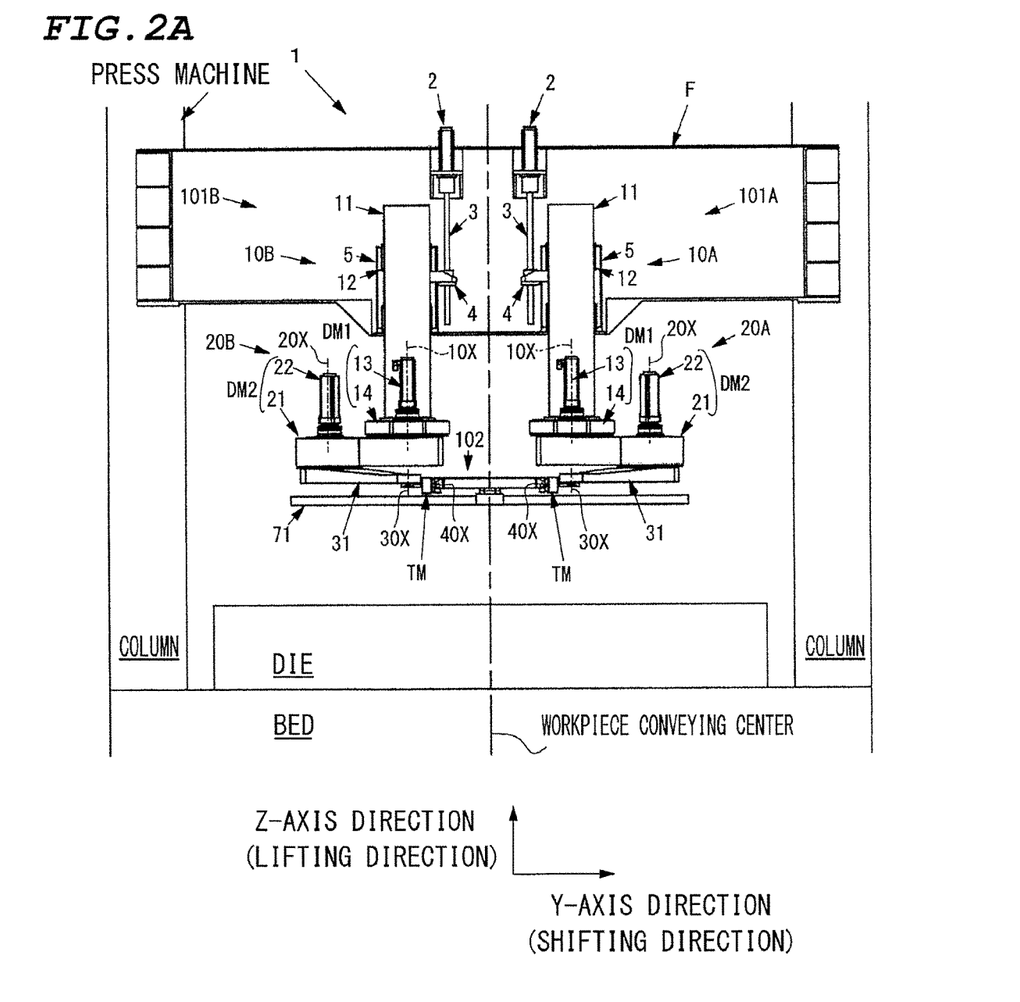
FIG. 2A is a front view for illustrating the overall configuration of the workpiece conveying apparatus according to the embodiment as viewed from an upstream in a workpiece conveying direction.
Figure 2B:
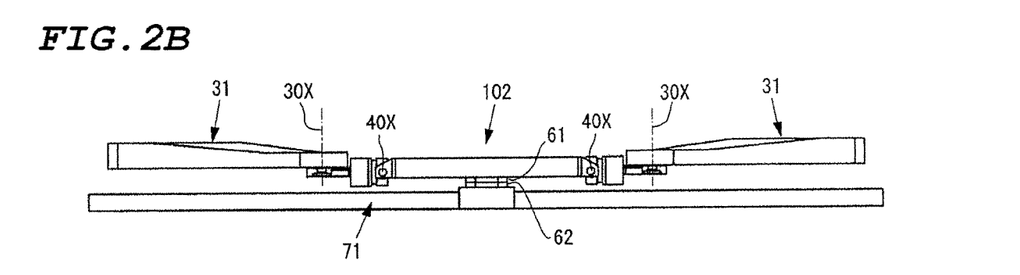
FIG. 2B is an enlarged front view for illustrating second arms, a cross arm, and a cross bar of FIG. 2A.
Figures 3A, 3B, 3C:
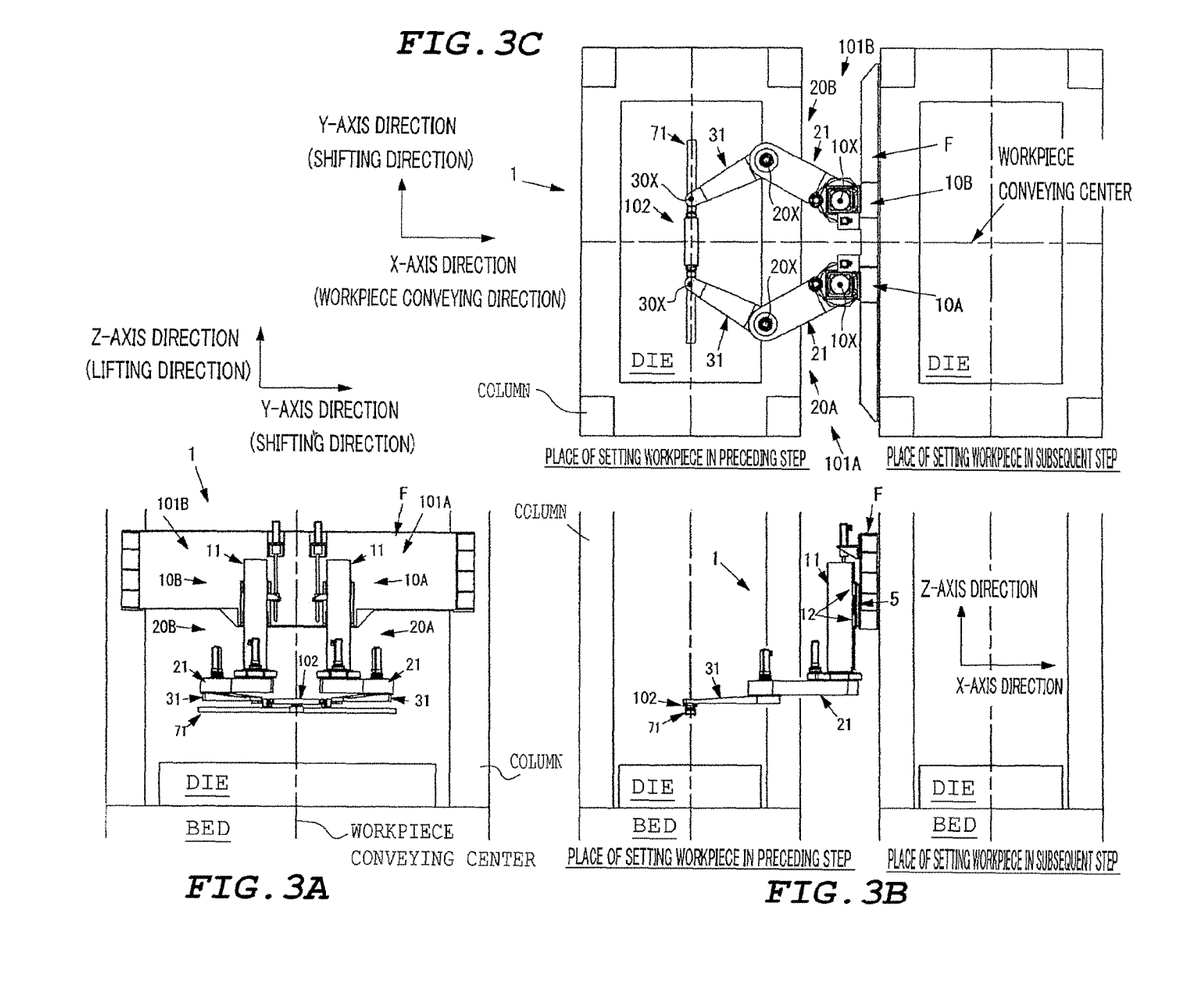
FIG. 3A is a front view for illustrating the overall configuration of the workpiece conveying apparatus according to the embodiment.
FIG. 3B is a right side view of FIG. 3A.
FIG. 3C is a plan view of FIG. 3B.
Figure 4A:
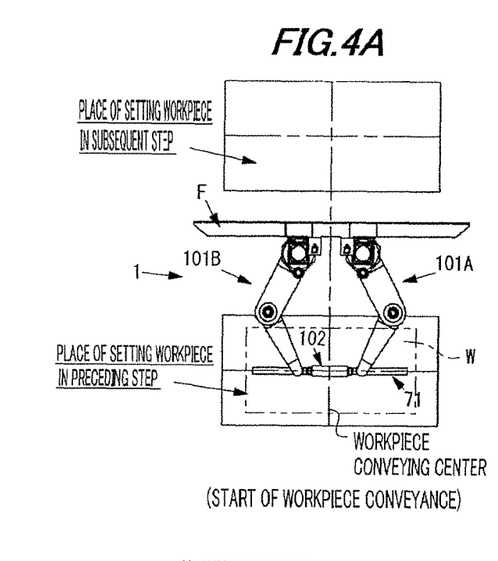
FIG. 4A, FIG. 4B, FIG. 4C, FIG. 4D, and FIG. 4E are plan views for illustrating, in a stepwise manner, states in which the workpiece conveying apparatus according to the embodiment conveys a workpiece W.

In Step 1, as illustrated in FIG. 4A, when the workpiece W is conveyed to a subsequent step, for example, when the workpiece W is carried into or out of a press machine, the servomotors (13 and 22) of each of the SCARA robots 101A and 101B are driven to rotate and actuate the first arm 21 and the second arm 31. Thus, the cross bar unit 103 is moved to a position above the workpiece W to be conveyed, for example, the workpiece on a conveyor or on a die of a press machine for a preceding step.

At this stage or prior to this stage, the servomotors 2 are driven in synchronization with each other so as to lower the SCARA robots 101A and 101B in synchronization with each other, thereby bringing a drawing section (suction cups 81B) of each of the grasping tools 81 arranged on the cross bar 71 into close contact with an upper surface of the workpiece W. In this state, the workpiece W is drawn and held on the drawing section due to an action of a drawing force of the drawing section (suction cups 81B) of each of the grasping tools 81, for example, an action of drawing the workpiece W by negative pressure or attracting the workpiece W by magnetism.

The workpiece W drawn on the grasping tools 81 is lifted up along with raising of the entire robots 101A and 101B by the servomotors 2.

<Step 2>

Figure 4B:
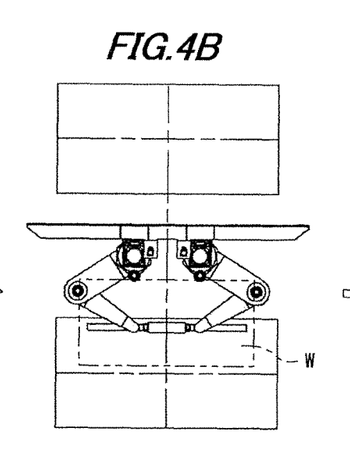
Figure 4C:
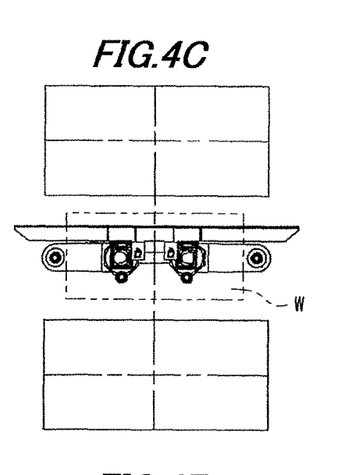
Figure 4D:
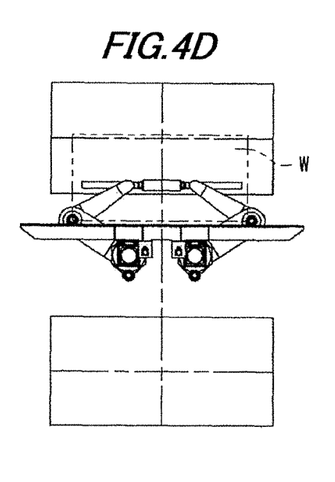

In Step 2, the workpiece W, which has been lifted up in Step 1 owing to actions of the first arm 21 and the second arm 31 of each of the robots 101A and 101B, the servomotors 13 and 22 of each of the robots 101A and 101B, and the like, is conveyed to a downstream in the workpiece conveying direction which is the X-axis direction (see FIG. 4B, FIG. 4C, and FIG. 4D in the stated order).

<Step 3>

Figure 4E:
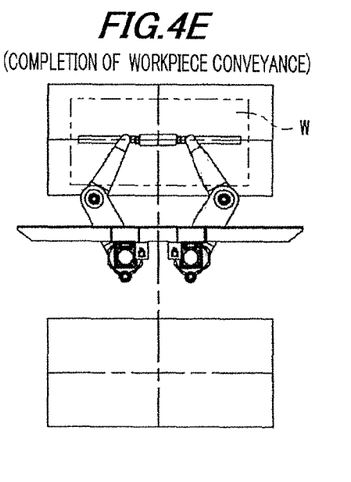

As illustrated in FIG. 4E, the workpiece W has been conveyed to above a position to which the workpiece W is to be conveyed. Thus, in Step 3, the servomotors 13 and 22 and the like are stopped to stop movement of the first arms 21 and the second arms 31, whereas the entire robots 101A and 101B are lowered by the servomotors 2.

<Step 4>

In Step 4, the drawing force of the drawing section of each of the grasping tools 81 mounted to the cross bar 71 is canceled, thereby releasing the workpiece W. In this manner, conveyance of the workpiece is completed.

After conveyance of the workpiece W is completed, the grasping tools 81 are raised. The raising is performed by raising the robots 101A and 101B by the servomotors 2 in synchronization with each other.

After that, owing to the actions of the first arm 21 and the second arm 31 of each of the robots 101A and 101B, the servomotors 13 and 22 of each of the robots 101A and 101B, and the like, the cross bar 71 and the grasping tools 81 are moved to above a position at which a workpiece W to be conveyed next is placed. Specifically, returning operations from the state illustrated in FIG. 4E to the state illustrated in FIG. 4A are performed. In other words, operations are performed in the order reverse to that indicated by the arrows of FIG. 4A to FIG. 4E.

Through repetition of the series of the operations afterward, the workpiece is sequentially conveyed to downstream steps.

<Operation of Causing Workpiece to Rotate about X-Axis (or Roll)>

Figure 12A:
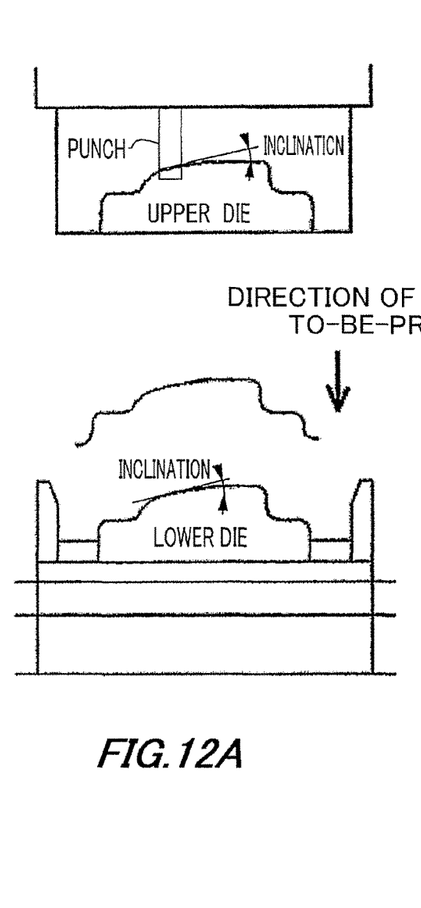
FIG. 12A is a front view for illustrating a problem that arises when the workpiece is conveyed so as to be horizontally balanced with a lower die, that is, an example in which a punch is driven into a surface of the workpiece at an oblique angle.
Figure 12B:
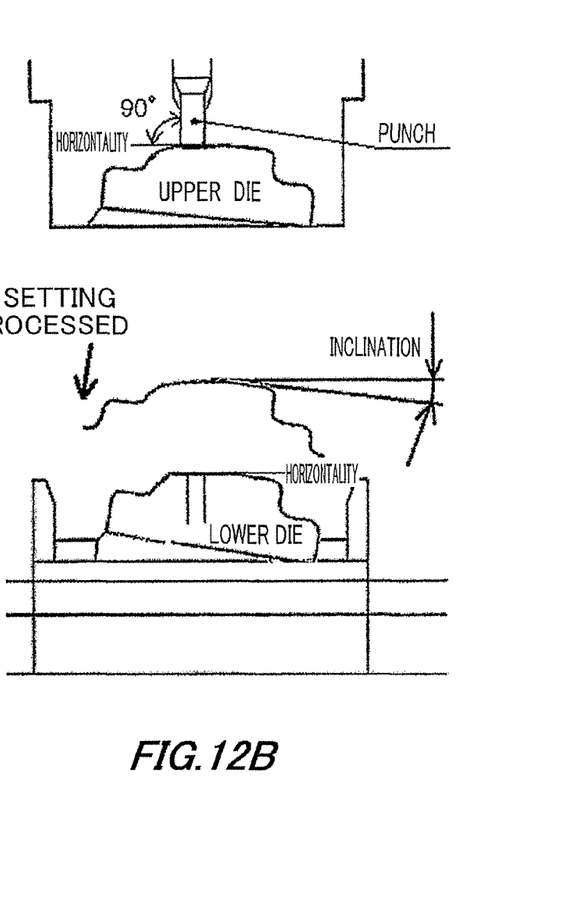
FIG. 12B is a front view for illustrating the fact that the punch can be driven into the surface of the workpiece at a right angle by arranging the lower die obliquely to enable conveyance of the work piece in an inclined (or rolled) state.

When a die is placed obliquely, for example, when it is desired that a punch be driven into the workpiece exactly along a thickness direction of the workpiece in view of quality of a finished product, specifically, in view of an appearance of a punched hole (see FIG. 12A and FIG. 12B), it is necessary to cause the grasped workpiece W to incline within the YZ plane or in the height direction, for example, to cause the grasped workpiece W to rotate about the X-axis (or roll). The workpiece conveying apparatus 1 according to this embodiment can meet such necessity.

Figure 9:
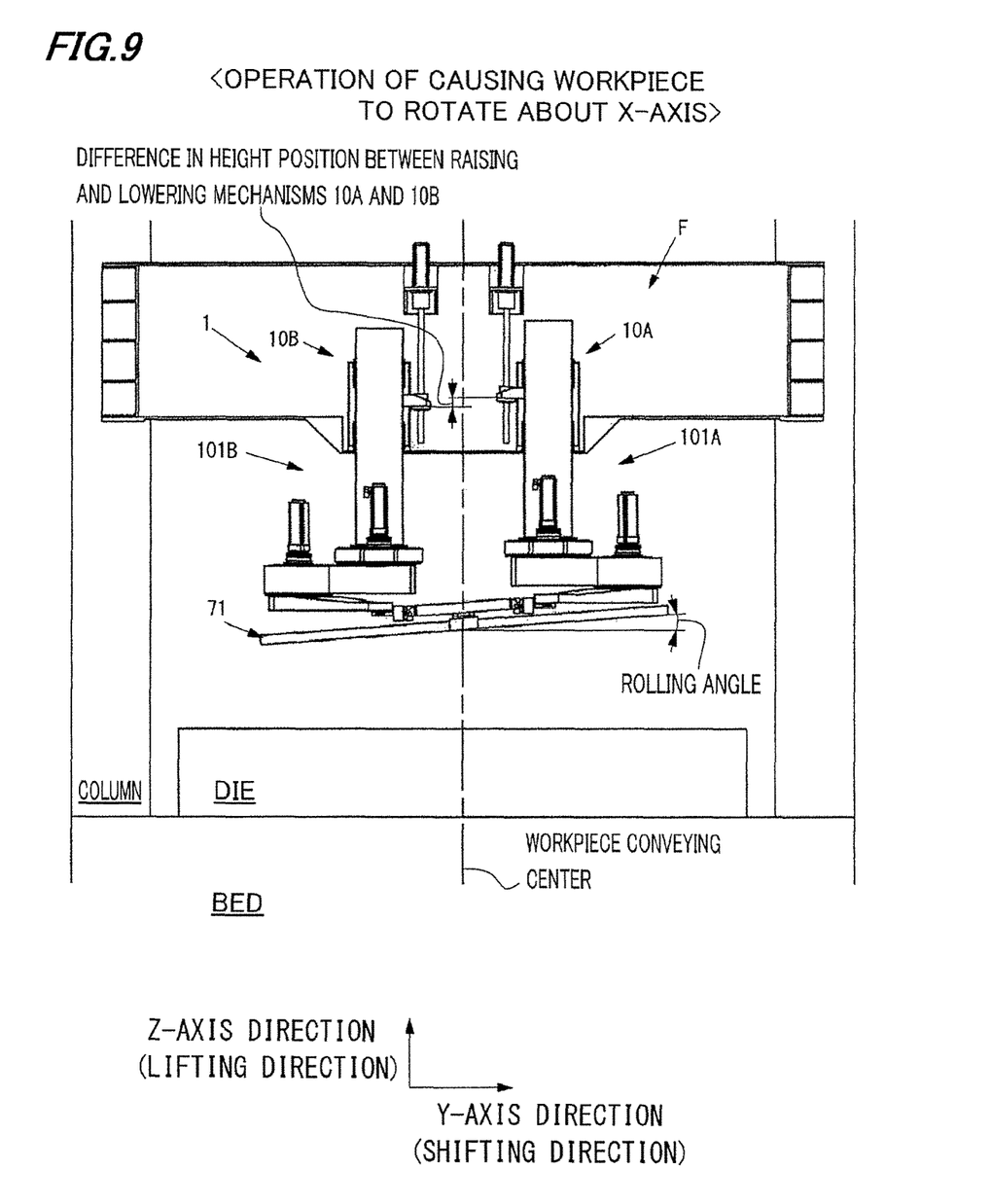
FIG. 9 is a plan view for illustrating a state in which the cross bar (workpiece) is caused to rotate about an X-axis (or roll) in the workpiece conveying apparatus according to the embodiment.
Figure 10A:
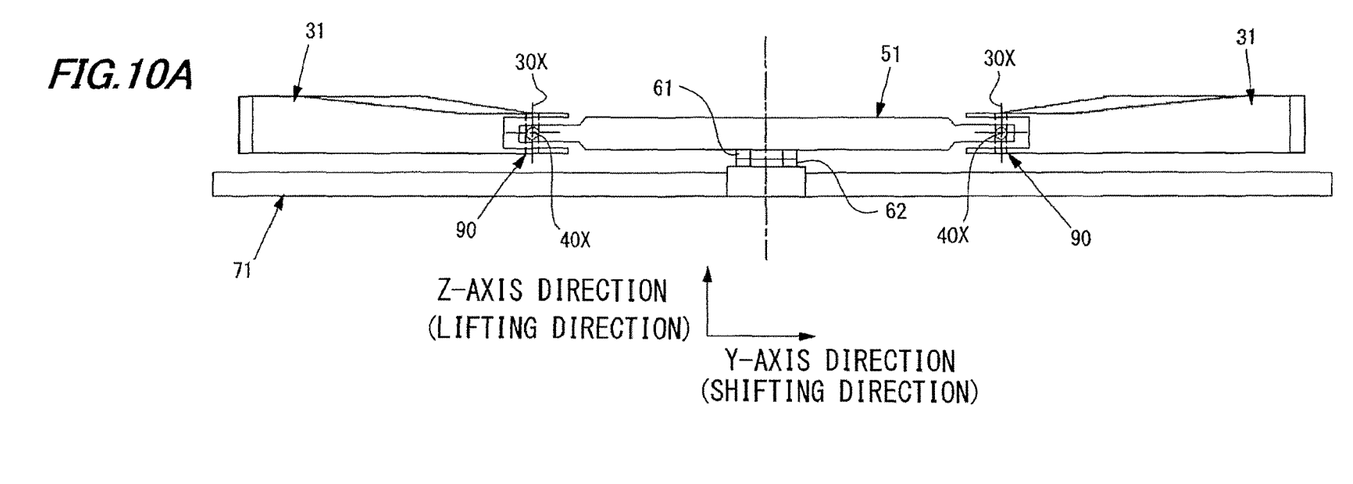
FIG. 10A is an enlarged front view for illustrating the second arms and the cross arm, which are coupled together using universal joints, in the workpiece conveying apparatus according to the embodiment.
Figure 10B:
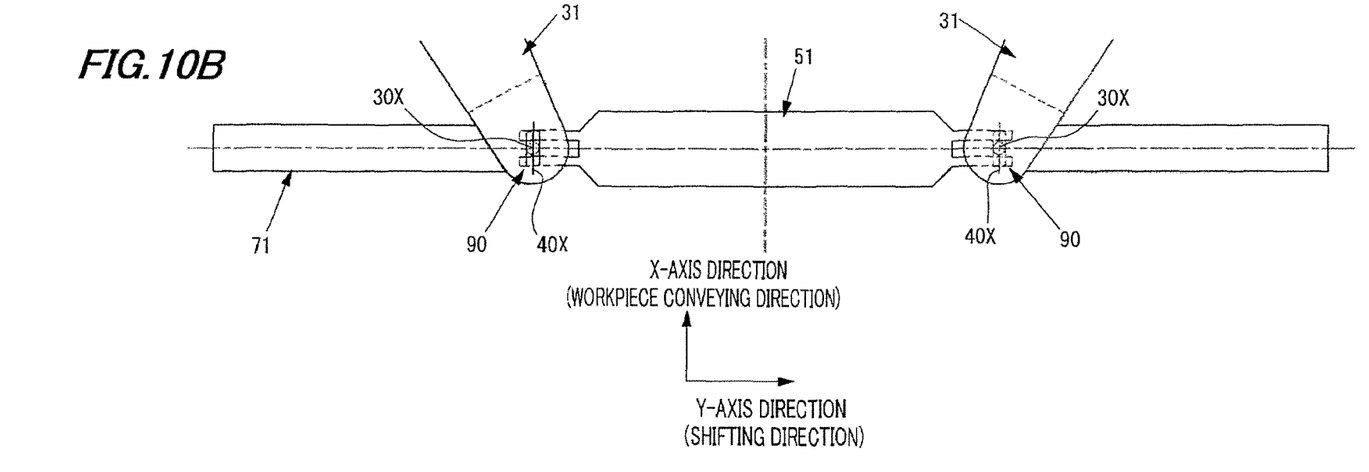
FIG. 10B is a plan view of FIG. 10A.
Figure 11A:
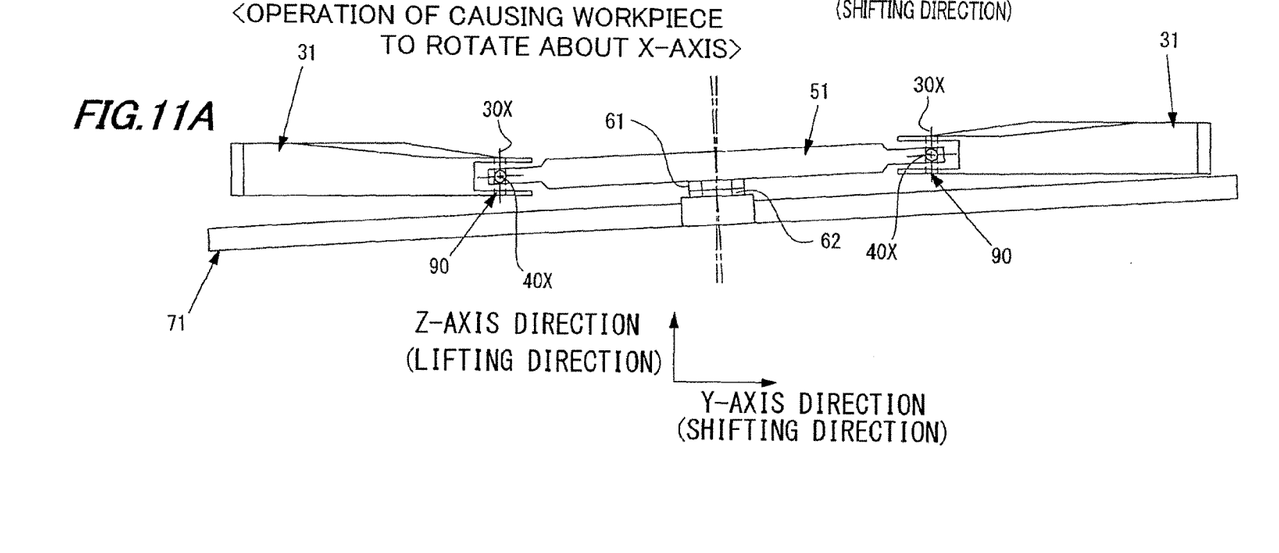
FIG. 11A is a front view for illustrating a state in which the second arms and the cross arm, which are coupled together using the universal joints, of FIG. 10A and FIG. 10B are caused to rotate about the X-axis (or roll).
Figure 11B:
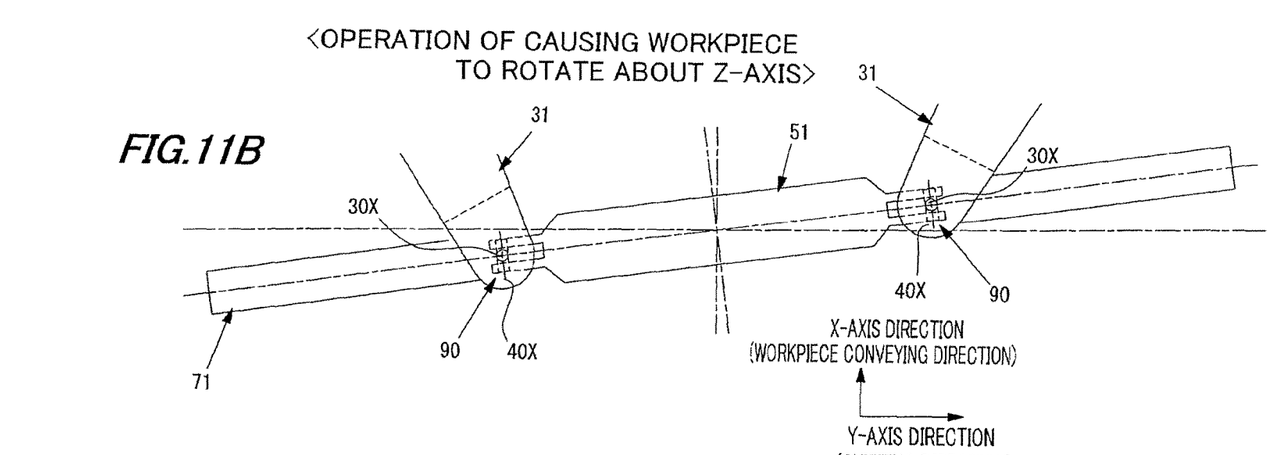
FIG. 11B is a plan view for illustrating a state in which the second arms and the cross arm, which are coupled together using the universal joints, of FIG. 10A and FIG. 10B are caused to rotate about the Z-axis (or yaw).

That is, as illustrated in FIG. 9, the servomotors 2 for the right and left robots 101A and 101B are mutually independently controlled, that is, controlled so as to move the robots 101A and 101B to positions different in height, thereby being capable of inclining the cross bar 71 and the grasping tools 81 within the YZ plane. Under the state in which the cross bar 71 and the grasping tools 81 are inclined, the right and left robots 101A and 101B are lowered, thereby being capable of placing the workpiece on a die that is arranged obliquely.

<Operation of Causing Workpiece to Rotate about Y-Axis (or Pitch or Tilt)>

Further, the workpiece conveying apparatus 1 according to this embodiment can meet such a necessity to cause the cross bar 71 and the grasped workpiece W to rotate about the Y-axis (or tilt or pitch).

Figure 5:
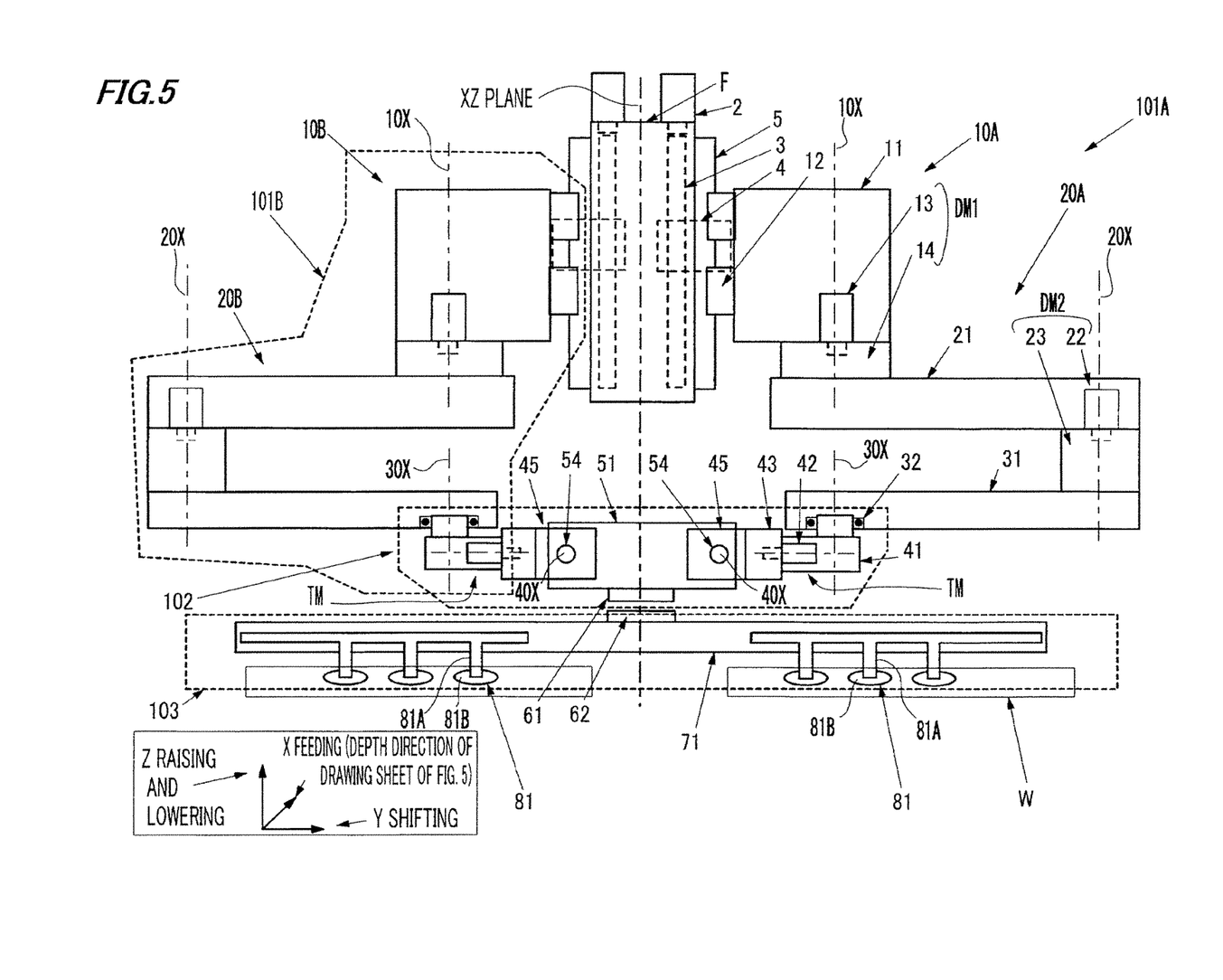
FIG. 5 is a front view for illustrating details of a configuration example of the workpiece conveying apparatus according to the embodiment.
Figure 6:
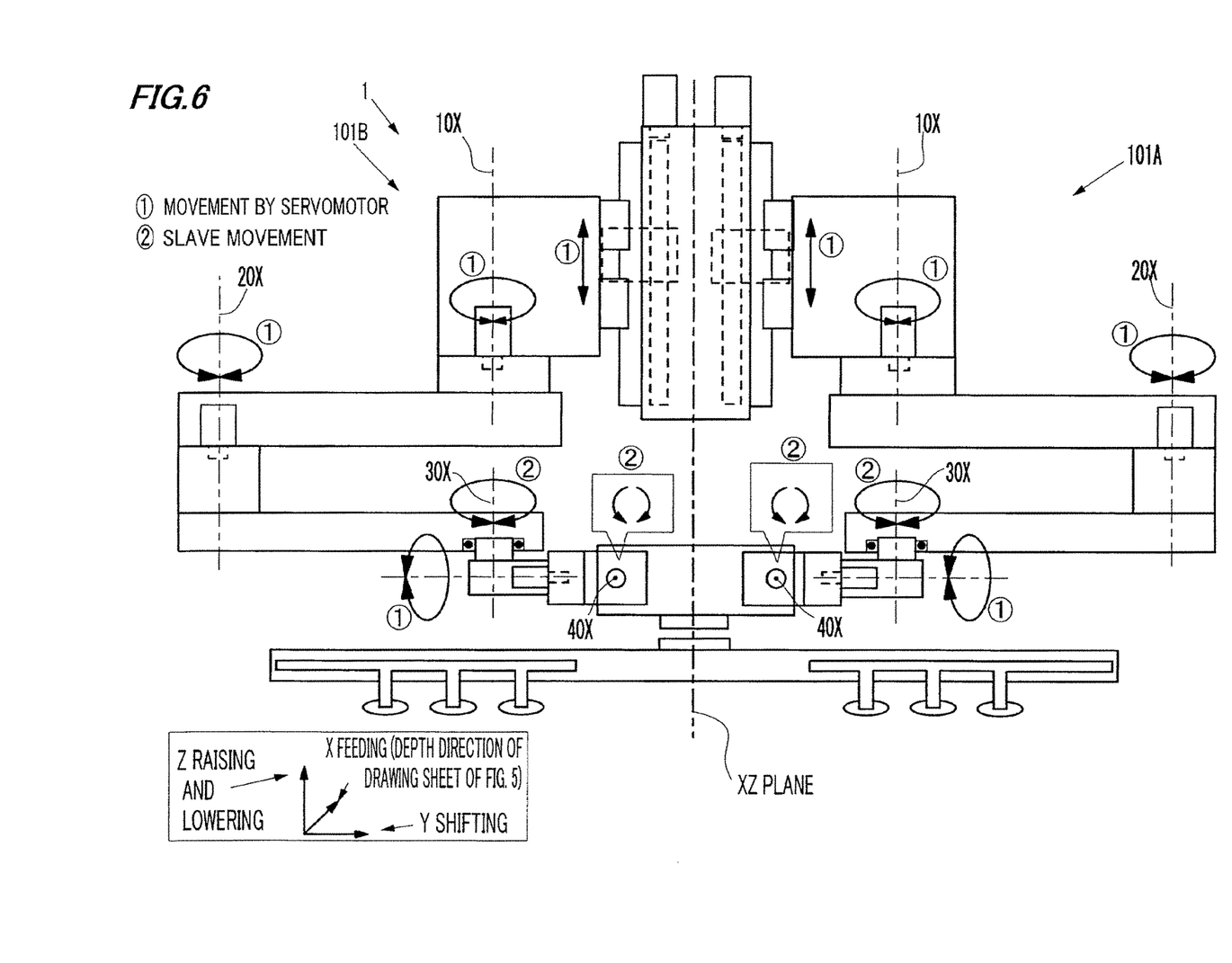
FIG. 6 is a front view for illustrating directions of movement and types of the movement (movement by a servomotor and slave movement) of movable components in the configuration example of the workpiece conveying apparatus according to the embodiment illustrated in FIG. 5.

That is, as illustrated in FIG. 5, through driving of each tilting mechanism TM, which includes the servomotor 42, the speed reducer 43, and the like and is arranged between the distal end of the second arm 31 and the holder 45 mounted at each end of the cross arm 102, the workpiece W, the center arm 51, the cross bar 71, and the grasping tools 81 can be rotated about the Y-axis which is the shifting axis (or tilted).

<Operation of Causing Workpiece to Rotate about Z-Axis (or Yaw)>

Further, the workpiece conveying apparatus 1 according to this embodiment can meet such a necessity to cause the cross bar 71 and the grasped workpiece W to rotate about the Z-axis (or yaw) within the horizontal plane, that is, within the XY plane.

Figure 8:
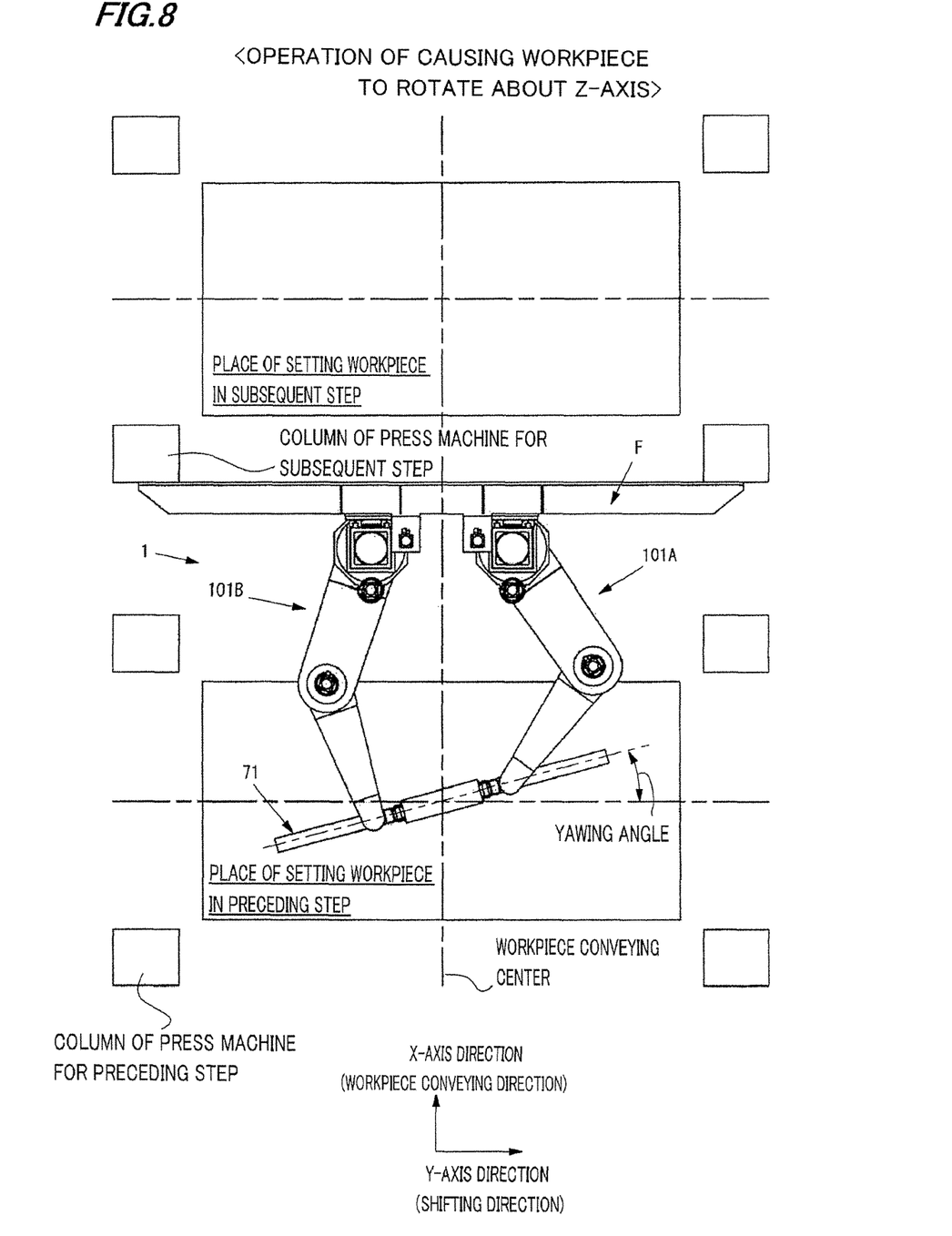
FIG. 8 is a plan view for illustrating a state in which the cross bar (workpiece) is caused to rotate about a Z-axis (or yaw) in the workpiece conveying apparatus according to the embodiment.

That is, as illustrated in FIG. 8, movement of the arm units 20A and 20B of the right and left robots 101A and 101B, each of which includes the first arm 21 and the second arm 31, is mutually independently controlled, that is, the first arm driving mechanism DM1 and the second arm driving mechanism DM2 of each of the arm units 20A and 20B are controlled so that rotation angle positions of the first joints 10X and the second joints 20X differ from one another. In this manner, the cross bar 71 and the grasping tools 81 can be rotated about the Z-axis.

<Operation of Causing Workpiece to Move in Y-Axis Direction (or Shift)>

In addition, the workpiece conveying apparatus 1 according to this embodiment can meet such a need to cause the cross bar 71 and the grasped workpiece W to move (or shift) in a direction, specifically, the Y-axis direction or the width direction orthogonal to the workpiece conveying direction, which is the X-axis direction.

Figure 7:
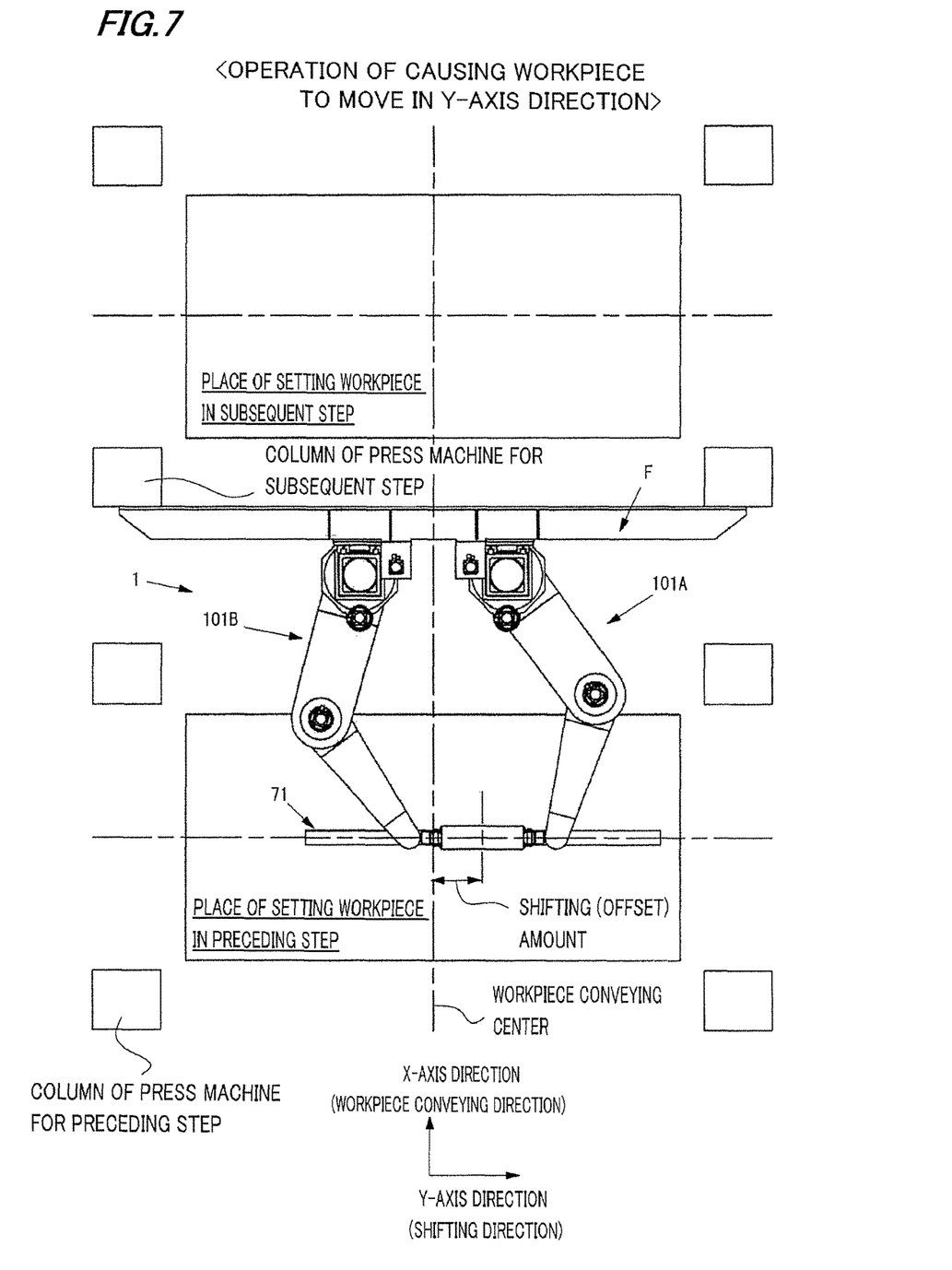
FIG. 7 is a plan view for illustrating a state in which the cross bar (workpiece) is caused to move (or shift) in a Y-axis direction in the workpiece conveying apparatus according to the embodiment.

That is, as illustrated in FIG. 7, movement of the arm units 20A and 20B of the right and left robots 101A and 101B, each of which includes the first arm 21 and the second arm 31, is mutually independently controlled, that is, the first arm driving mechanism DM1 and the second arm driving mechanism DM2 of each of the arm units 20A and 20B are controlled so that rotation angle positions of the first joints 10X and the second joints 20X differ from one another. In this manner, the cross bar 71 and the grasping tools 81 can be moved (or shifted) in the direction, which is the Y-axis direction, orthogonal to the workpiece conveying direction which is the X-axis direction.

In the description above, the cross arm 102 is connected to the distal end of each second arm 31 through intermediation of the third joint 30X that corresponds to a vertical pivot axis, that is, a pivot axis extending along the Z-axis. Further, in order to enable the cross arm 102 to rotate about the X-axis (or roll), each end of the center arm 51 and the bracket 41, which is connected to the second arm 31 so as to be freely rotatable about the third joint, are connected together through intermediation of the bearing 54 (fourth joint 40X) that is freely rotatable about the X-axis.

However, the present invention is not limited to the above-mentioned configuration. For example, as illustrated in FIG. 10A, FIG. 10B, FIG. 11A, and FIG. 11B, the distal end of each second arm 31 and the cross arm 102 may be connected together through intermediation of a universal joint 90. That it, the universal joint 90 may have a function of the third joint 30X corresponding to the pivot axis extending along the Z-axis, and a function of the fourth joint 40X corresponding to a pivot axis extending along the X-axis.

As described above, the workpiece conveying apparatus 1 according to this embodiment not only can convey the workpiece in the workpiece conveying direction which is the X-axis direction, but also can cause the workpiece to rotate about the X-axis (or roll), rotate about the Y-axis (or tilt), rotate about the Z-axis (or yaw), move in the Z-axis direction (or lift), and move in the Y-axis direction (or shift).

That is, according to the present invention, it is possible to provide the workpiece conveying apparatus for a pressing machine capable of, with the relatively simple, low-cost, lightweight, and compact configuration, changing the posture of the workpiece with the high degree of freedom.

The embodiment described above is merely an example for describing the present invention, and various modifications may be made without departing from the gist of the present invention.

What is claimed is:

1. A workpiece conveying apparatus for a pressing machine, comprising:
   two robots arranged symmetrically with respect to an XZ plane passing a workpiece conveying center, each of the two robots comprising:
   a raising and lowering frame supported on a stationary frame so as to be movable in a Z-axis direction that is an up-and-down direction, the stationary frame being mounted to extend along a Y-axis direction that is a width direction orthogonal to an X-axis direction that is a workpiece conveying direction of a passage space for conveying a workpiece;
   a first arm supported at a proximal end side thereof by the raising and lowering frame through a first joint so as to be freely rotatable within a horizontal plane;
   a second arm supported at a proximal end side thereof by a distal end side of the first arm through a second joint so as to be freely rotatable within the horizontal plane;
   a first arm driving mechanism configured to drive the first arm to rotate about the first joint with respect to the raising and lowering frame; and
   a second arm driving mechanism configured to drive the second arm to rotate about the second joint with respect to the first arm;
   two raising and lowering mechanisms arranged to correspond to the two robots, respectively, and configured to enable the corresponding raising and lowering frames to mutually independently move in the Z-axis direction, so that the two robots moves in the up-and-down direction independently of each other with respect to the stationary frame;
   a cross arm configured to couple distal ends of second arms arranged on both sides across the XZ plane so as to be freely rotatable within the horizontal plane through a third joint and freely rotatable within a vertical plane through a fourth joint while a plane within which the first and second arms rotate is kept in the horizontal plane, the fourth joint is an axle bearing which has a rotation axis crossing a longitudinal-length direction of the cross arm; and
   a workpiece holding unit connected to the cross arm and configured to releasably hold the workpiece; wherein respective rotation planes of the first and second arms are respectively kept in the horizontal plane, even when the cross arm is inclined in a YZ plane by changing mutually independently the respective heights in the Z axis direction of the two robots.

2. The workpiece conveying apparatus for a pressing machine according to claim 1, wherein the workpiece holding unit is removably connected to the cross arm.

3. The workpiece conveying apparatus for a pressing machine according to claim 1, further comprising a tilting mechanism configured to rotate one of the cross arm and the workpiece holding unit about a rotation axis parallel to a longitudinal direction of the one of the cross arm.

4. The workpiece conveying apparatus for a pressing machine according to claim 1, wherein the fourth joint supports the cross arm to be rotatable within a YZ plane.

5. The workpiece conveying apparatus for a pressing machine according to claim 1, wherein the rotation axis is an axis extending in a horizontal plane.

* * * * *